United States Patent [19]

Prebil

[11] 3,853,270
[45] Dec. 10, 1974

[54] MOTOR RAPID WARMING DEVICE

[76] Inventor: Stanley Prebil, 2800 Gabriel Ave., Zion, Ill. 60099

[22] Filed: July 30, 1973

[21] Appl. No.: 383,724

[52] U.S. Cl........ 237/12.3 B, 123/41.14, 123/41.51
[51] Int. Cl............................................. B60h 1/04
[58] Field of Search............ 237/12.3 B, 44, 12.3 R, 237/59; 123/41 R, 41.14, 41.51

[56] References Cited
UNITED STATES PATENTS

| | | |
|---|---|---|
| 3,498,539 | 3/1910 | Boemfeld et al................. 123/41.14 |
| 3,523,644 | 8/1970 | Kozinski........................... 123/41.14 |
| 3,770,195 | 11/1973 | Franz................................... 236/87 |

*Primary Examiner*—Kenneth W. Sprague
*Assistant Examiner*—W. E. Tapolcai, Jr.

[57] ABSTRACT

A motor rapid warming device for use in vehicles having a fluid cooling system consisting of a unitarily formed thermally insulated coolant storage tank interposed in the cooling system between the coolant pump and a hot-coolant heater for the vehicle passenger compartment, the tank adapted to store a volume of fluid coolant approximately equal to the capacity of the vehicle cooling system and maintain the same hot in the tank after the engine is stopped for an extended period of time, and control means associated with the tank to automatically close the inlet and outlet ports of the tank upon stoppage of the motor in a manner to retain the hot motor coolant therein, the control means automatically opening the inlet and outlet tank ports upon the starting of the motor such that the supply of hot coolant is automatically delivered to the heater and to the motor when the motor is started.

1 Claim, 3 Drawing Figures

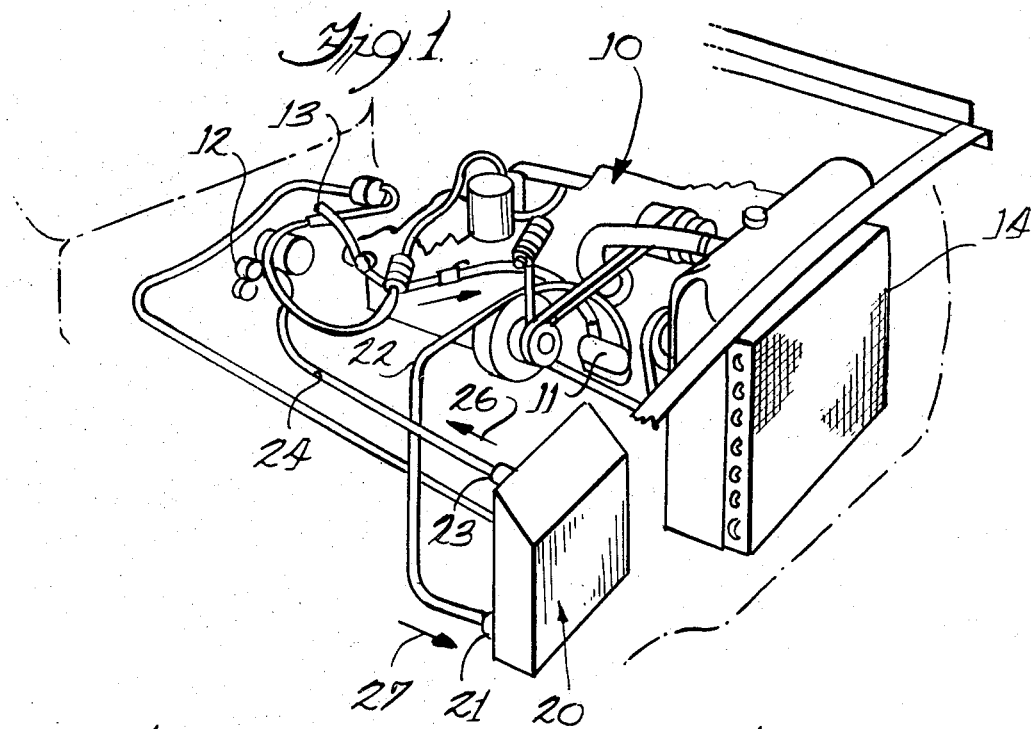
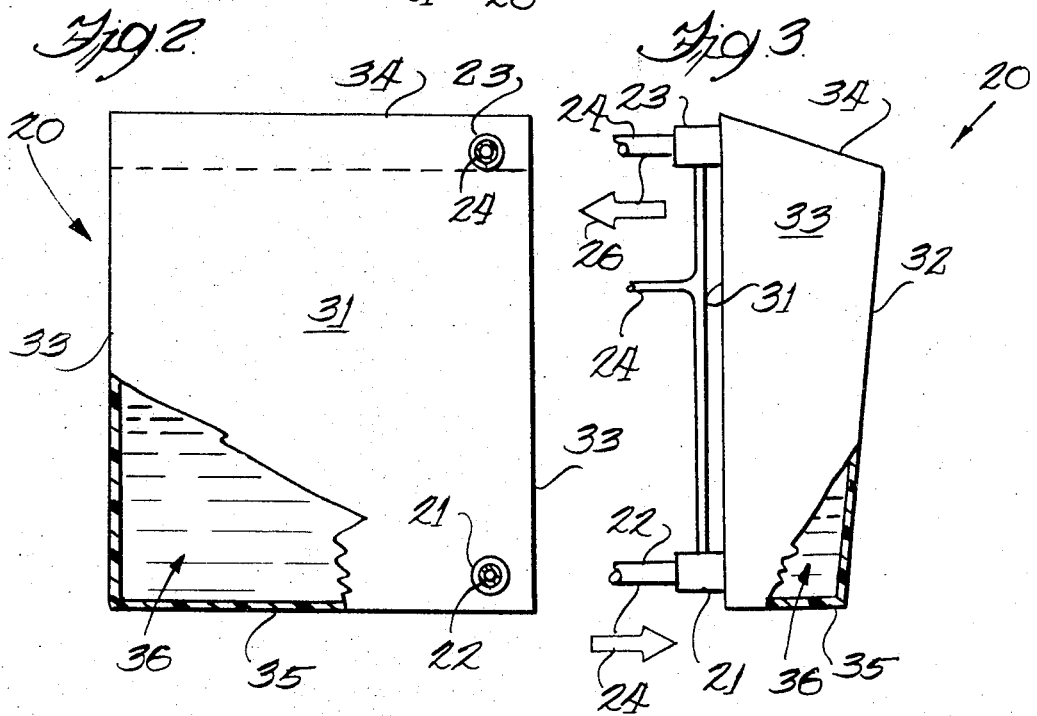

MOTOR RAPID WARMING DEVICE

BACKGROUND OF THE INVENTION

1. Field of the Invention

This invention relates generally to motor vehicles and more particularly to a device for providing the vehicle with hot motor coolant for delivering into a coolant heated heater and to the motor during start-up of the motor after the motor has not been running for a period of time.

2. Description of the Prior Art

It is well known that during cool or cold ambient temperature conditions it takes several minutes for the motor of a vehicle to warm up sufficiently to supply hot coolant to a heater at a usable temperature for providing heating facilities to the vehicle passenger compartment during the initial start-up period. Further, it is well known that the most severe damage to a motor of a vehicle takes place during the initial start-up when the motor is cold until the oil and other lubricants have been heated to the proper operating temperatures to provide proper lubrication to the motor.

This start-up problem is most noticeable in cold weather driving, such as encountered during the winter time, and several attempts have been made in the prior art to solve this problem by providing a tank on the vehicle for the storage of some hot coolant from the vehicle radiator and motor during idle periods of the motor. However, such systems devised and found in the prior art have thus far involved too many practical difficulties in the matters of complexity of operation, difficulty of installation, costly to produce, and the like, such that the same have not been particularly desirable to vehicle manufacturers or as accessory items to be added later to a vehicle for such reasons.

It would thus be preferable to provide an economic motor rapid warming device for providing hot motor coolant to a heater and to the motor during initial start-up periods.

SUMMARY OF THE INVENTION

The present invention remedies and overcomes all of the foregoing deficiencies and disadvantages of presently available motor warming devices by providing a novel unitarily formed thermally insulated coolant storage tank for holding and maintaining in a hot manner a supply of hot motor coolant after the motor has been stopped, and for automatically delivering the hot coolant back to the heater and motor when the motor is restarted.

It is a feature of the present invention to provide a motor rapid warming device which is economical in construction, simple and reliable in operation, and readily adapted to a vehicle motor with a minimum of time and expense for retaining hot motor coolant therein when the motor is stopped and for delivering the hot motor coolant back to the motor upon the restarting thereof.

Still a further feature of the invention is to provide a motor rapid warming device utilizing components of a conventional motor heating and cooling system and readily adapted to be connected thereto in a manner to provide relatively hot motor coolant to the heater and motor during initial start-up of the motor.

The provision of a motor rapid warming device for use in vehicles such as briefly outlined above, and possessing the stated advantages, constitutes the principal features of the present invention. The provision of a motor warming device which is relatively inexpensive to manufacture due to its simplicity of construction and which may be readily manufactured by simple manufacturing methods; one which is rugged and durable and which therefore may be guaranteed by the manufacturer to withstand many years of daily usage; one which may, in its entirety, be manufactured and installed as part of the original equipment of the vehicle, or which may be attached to the vehicle later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a fragmentary perspective view of a vehicle motor having the motor rapid warming device of the present invention connected into the cooling system thereof;

FIG. 2 is a front elevational view of the insulated storage tank of the invention, partially broken away to show the wall structure thereof, and illustrating the inlet and outlet ports; and FIG. 3 is a side elevational view of the storage tank and associated inlet and outlet valves of FIG. 2.

DESCRIPTION OF THE PREFERRED EMBODIMENT

Referring now to the drawings, there is shown in FIG. 1 a conventional internal combustion type engine generally designated by reference numeral 10 having a coolant pump 11 operably driven by the motor and adapted for pumping motor coolant through passageways (not shown) in the motor block for cooling of the same as well as pumping the hot coolant to the inlet port 12 of a coolant heated heater and thence out of the heater through outlet port 13 back to the motor and into the radiator structure 14 where it is cooled and recirculated back to the motor 10.

Interposed between the pump 11 and heater inlet 12 is a thermally insulated coolant storage tank 20 having a vacuum operated inlet valve 21 connected by suitable tubing 22 to the pump 11, and a vacuum operated outlet valve 23 connected by suitable tubing 24 to the heater inlet 12. It is thus seen that the storage tank 20 is connected in a series manner with the engine cooling system so that all coolant from the system passes through the storage tank. The storage tank 20 is preferably unitarily formed and preferably has a fluid capacity approximately equal to the fluid capacity of the remaining cooling system.

The vacuum operated valves 21 and 23 are connected by suitable tubing 24 to a source of vacuum (not shown) on the motor wherein a vacuum is applied to the valves when the motor is started and running, this vacuum serving to open the valves permitting fluid flow therethrough in the direction of arrows 26 and 27, with the stopping of the motor discontinuing the source of vacuum such that the valves 21 and 23 will automatically close when the motor is stopped. It is thus seen that valves 21 and 23 automatically operate with the operation of the motor, starting of the motor opening the valves with the stopping of the motor closing the valves. It is to be understood that valves other than vacuum operated may be supplied, such as electrically operated valves or the like, with the vacuum operated valves being preferable for economic reasons.

The storage tank 20 is preferably formed of a rectangular boxlike configuration having a front wall 31, a back wall 32, spaced apart side walls 33, and spaced apart top and bottom walls 34 and 35 respectively. An internal fluid tight chamber 36 is defined within walls 31–35 with input and output from the chamber being made via inlet valve 21 and outlet valve 23 which are preferably formed integrally with the front wall 31 of the tank 20 with the inlet valve being formed at the bottom end thereof and the outlet valve being formed at the top end thereof. It is to be understood that the tank 20 may take other configurations within the scope of the invention, with it being noted that the top wall 34 is preferably tapered in an outward and upward direction from the back wall 32 toward the front wall 31 in a manner to prevent air pockets from accumulating in the storage tank in a manner which would prevent the proper operation thereof.

It is thus seen that the storage tank 20 is connected in fluid series with the conventional motor vehicle cooling system such that during the normal operation of the motor the coolant circulates through the cooling system and through the storage tank since vacuum operated valves 21 and 23 are maintained in the open position during operation of the motor. When the motor is shut off, the source of vacuum maintaining the valves 21 and 23 in the open position is discontinued so that the vacuum valves are automatically closed thereby trapping a volume of heated motor coolant in the storage tank 20. When the motor is re-started, a source of vacuum is again initiated effecting the automatic opening of valves 21 and 23 to permit circulation of the heated motor coolant from the storage tank out of outlet valve 23 and into the heater inlet 12 to provide immediate heat to the passenger compartment, the heated coolant passing through the heater and into the block of the motor 10 to immediately begin the warming of the motor to rapidly raise the oil and associated motor lubricants to the desired operating temperature so as to reduce the amount of time the motor is operating without proper lubrication.

It is to be understood that the storage tank 20 may be made in the form of various configurations and of various insulating materials, such as of inflated foam plastic-type walls, vacuum-type walls, and the like, and is readily mountable at numerous locations within the motor compartment, such as adjacent the radiator, or mounted on the engine firewall, and the like, such that no major design modifications are required to incorporate the storage tank 20 and associated vacuum operated valves 21 and 23 in a motor vehicle. It is also preferable that the vacuum valves 21 and 23 each be imbedded into the insulated part of the tank as much as possible so as to retain the heated coolant longer. Further, it is seen that the storage tank 20 may be readily mounted in any suitable position in the motor compartment of existing motor vehicles with it being a relatively simple matter to reroute the appropriate tubing leading to the heater through the insulated tank, with it being understood that once such rerouting has been accomplished the operation of the function of all of the vehicle cooling system is the same as previous to the installation of the storage tank.

Assuming that the motor has been running for a period of time sufficient to raise the motor coolant temperature to a normal operating temperature of 200°F, for example, and then the engine is stopped, such as when the vehicle is parked for a period of time, the valves 21 and 23 are automatically closed upon the stopping of the motor so as to trap a quantity of hot motor coolant in the storage tank. While the motor is shut off, the motor coolant in the container is maintained relatively hot, losing, for example, less than 1°F per hour when the ambient temperature is very low, such as being 0°F. Thus, if the vehicle is not started for a period of time of about 12 to 15 hours, such as overnight, the motor coolant temperature in the insulated storage tank 20 would have decreased by approximately 12° to 15°F such that the temperature of the hot coolant in the tank would still be about 185°F.

It is apparent that the motor coolant in the remainder of the cooling system would be at the ambient temperature or close thereto after a 12 to 15 hour period of standing. When the motor is now re-started the source of vacuum automatically opens valves 21 and 23 with the hot motor coolant previously trapped therein being forced from the storage tank first through the heater and then into the block of the motor, the supply of hot motor coolant in the tank being sufficient to provide immediate heater output to the vehicle passenger compartment for several minutes until the temperature of the overall cooling system reaches a usable point, with the lubricants in the engine being raised rapidly to desirable operating temperatures thereby substantially decreasing initial wear on a cold motor resulting in a greatly extended life expectancy for the motor.

To assist in the delivery of the hottest possible coolant from the storage tank 20 it is noted that the inlet valve 21 is provided at the bottom of the storage tank with the outlet valve being provided at the top of the storage tank as it is known that heat rises such that the hottest coolant will always be available to the outlet valve 23.

It is acknowledged that the coolant in the storage tank will only remain hot for a predetermined period of time after the motor is stopped, taking into consideration that the coolant will lose approximately less than 1°F for each hour standing time so that if the motor is not run for an extended period of time, such as for a week, then the coolant in the tank would most likely have cooled to a temperature equal to the temperature of the coolant in the remaining portions of the cooling system. This is not considered to be any disadvantage to the present invention as most vehicles are utilized daily so that the device of the present invention provides a practical and advantageous economical solution to a problem long encountered in the art with no feasible economic solution thereto being provided until the present invention.

The present motor rapid warming device thus provides hot motor coolant to the vehicle heater automatically and promptly upon start-up of the motor so that comforting warm air may be immediately realized in the vehicle passenger compartment, and also serves to introduce the hot coolant into the motor block to greatly decrease the warm-up time for a motor itself in a manner to also decrease the pollutants released to the atmosphere when a motor is running under a choked cold condition.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claim.

I claim:

1. Motor rapid warming device for use in vehicles having a motor, a vacuum source operable when the motor is running, a coolant pump operably driven by the motor, a coolant heated heater for supplying heat to the vehicle passenger compartment, coolant passages throughout the motor block of the motor for cooling the same, a fluid cooling system interconnecting the passageways in the motor block to the coolant pump and heater for delivering motor coolant to the heater and motor, the motor rapid warming device comprising:

a unitarily formed thermally insulated coolant storage tank for holding a supply of hot motor coolant therein and for maintaining the coolant therein at a relatively high temperature for an extended period of time when the motor is not running, the storage tank having a volume at least equal in capacity to the capacity of the coolant system of the motor;

the storage tank having a flat front vertical wall, a flat bottom horizontal wall, a pair of opposed parallel spaced apart flat vertical side walls, a flat back wall affixed along its bottom edge to the bottom wall and tapering upward and outwardly therefrom at an angle thereto and terminating at a position less than the vertical height of the front wall and spaced rearwardly therefrom, and a flat top wall extending from a top edge of the front wall in a downward slanted manner therefrom to be joined to the back wall;

a coolant containing chamber defined interiorly of the tank walls for holding the motor coolant therein;

an outlet port formed in the top portion of the front wall of the tank in communication with the interior chamber thereof;

an inlet port formed in the bottom portion of the front wall in communication with the chamber interiorly thereof;

a vacuum operated inlet valve connected to the inlet port;

a vacuum operated outlet valve connected to the outlet port;

suitable lengths of tubing connecting the storage tank in fluid series communication with the motor cooling system, the inlet valve adapted to be connected to the coolant pump of the motor, the outlet valve adapted to be connected to the heater of the vehicle with the hot coolant in the storage tank thus being firstly delivered to the heater and thence to the motor passageways when the motor is started; and the running of the motor applying a vacuum to each of the vacuum operated inlet and outlet valves to maintain the valves in an open position, the shutting-off of the motor effecting discontinuance of the vacuum source to the valves thus effecting the automatic closing of the valves upon the stopping of the motor in a manner to trap a quantity of hot motor coolant in the storage tank, the re-starting of the motor effecting the automatic opening of the vacuum valves to provide the hot motor coolant from the storage tank to the heater and motor block passageways promptly upon the starting of the motor so as to provide heat to the passenger compartment of the vehicle along with assisting in raising the operating temperature of motor lubricants to desired temperatures for proper functioning and lubrication thereby.

* * * * *